Figure 1:
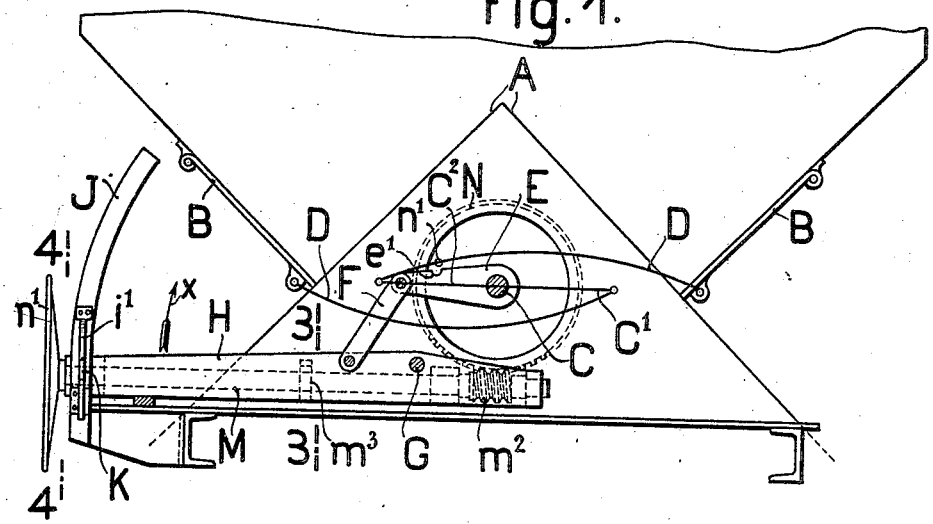

Feb. 20, 1923.

P. KRÜGER.
DUMPING WAGON.
FILED MAR. 17, 1922.

1,446,350.

2 SHEETS—SHEET 1.

Inventor;
Paul Krüger,
By Kiefer [?]
Attys

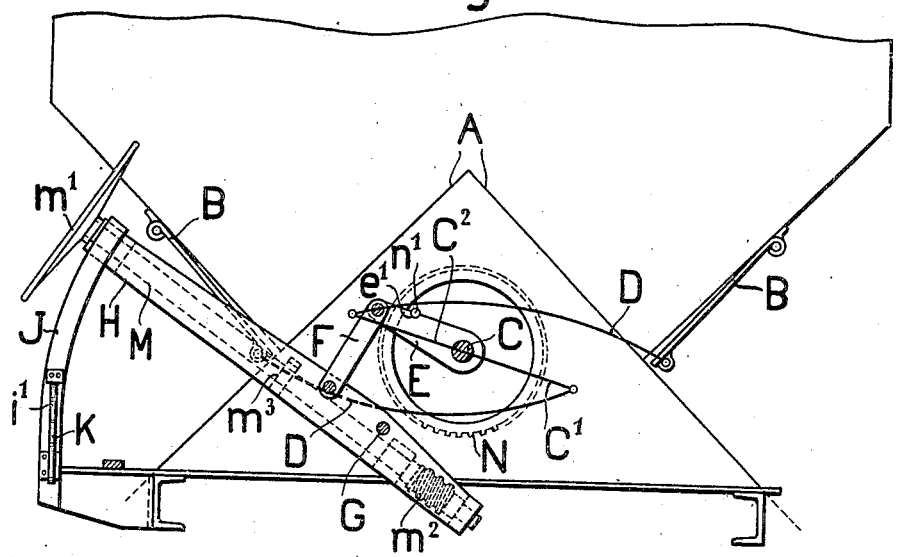
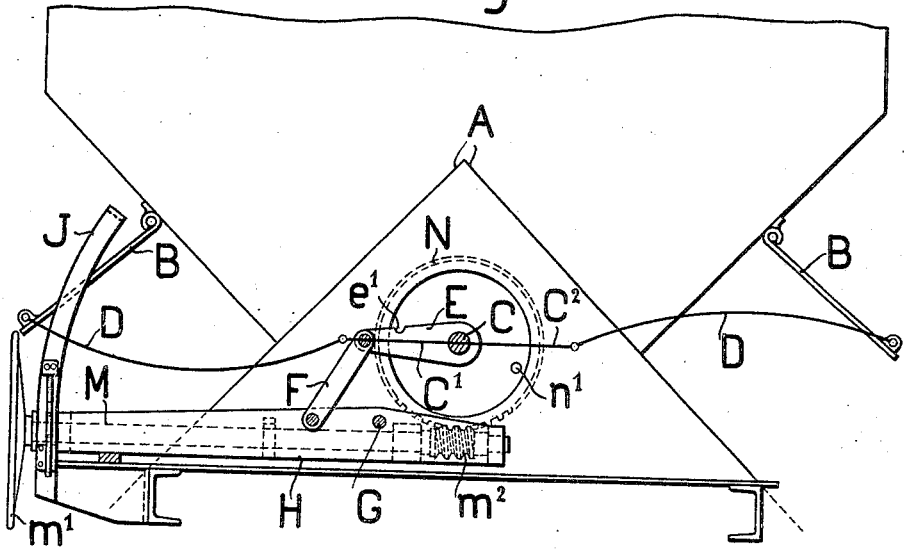

Patented Feb. 20, 1923.

1,446,350

UNITED STATES PATENT OFFICE.

PAUL KRÜGER, OF ESSEN, GERMANY, ASSIGNOR TO FRIED. KRUPP AKTIENGESELL-SCHAFT, OF ESSEN-ON-THE-RUHR, GERMANY.

DUMPING WAGON.

Application filed March 17, 1922. Serial No. 544,543.

*To all whom it may concern:*

Be it known that I, PAUL KRÜGER, residing at Essen, Germany, a citizen of the German Republic, have invented a certain new and useful Improvement in Dumping Wagons, of which the following is a specification.

This invention relates to dumping wagons, with the flaps of which is connected a crank-gear, the object being to reduce the expenditure of power in unloading the wagon.

The drawing illustrates an embodiment of the invention in a wagon having two side flaps and a saddle-shaped bottom.

Figure 2:
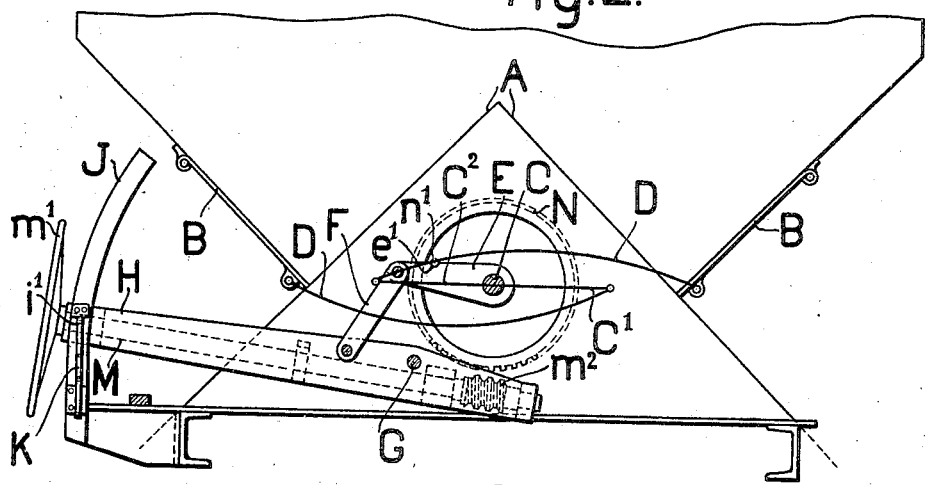

Fig. 1 being a rear view in the closed position,

Fig. 2 a similar view in a different position.

Figure 3:
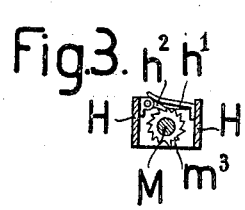
Figure 4:
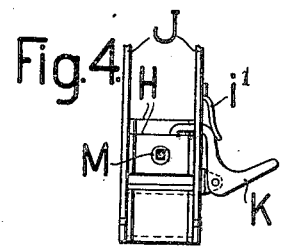

Fig. 3 a section on line 3—3 of Fig. 1, looking from the right,

Fig. 4 a section on line 4—4 of Fig. 1, looking from the left.

Figure 5:
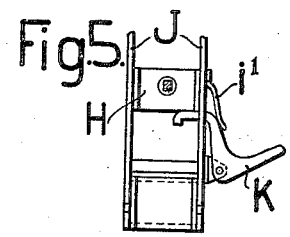

Fig. 5 a section similar to Fig. 4, in which the parts are shown in a different position, Fig. 6 a rear view, similar to Fig. 1, at the beginning of the unloading action, Fig. 7 a view similar to Fig. 1, showing the parts in the open position.

A represents the saddle-shaped bottom, rigidly connected with the under-frame of the wagon, and B the flaps pivoted at their upper edges. On a shaft C is rigidly mounted a two-armed member $C^1$ $C^2$ each arm of which is connected by a rod D with one of the side flaps B. Loose on the shaft C is a crank-arm E, which is connected by a rod F to a hand-lever H, pivoted on a shaft G. Said lever H is laterally guided in a guide-way J, Figs. 4 and 5, to which is pivoted a pawl K, acted upon by a spring $i^1$ and passing through a slot (not shown) in said guide-way, said pawl holding the lever H in two different positions relatively to said guide-way. In the hand-lever H is journaled a shaft M, which carries a hand-wheel $m^1$ on its end towards the guide-way J, and a worm $m^2$ on its other end. There is also a ratchet wheel $m^3$, Fig. 3, on the shaft M, with which engages a pawl $h^2$, pivoted on the lever H and acted upon by a spring $h^1$. This pawl and ratchet mechanism allows the shaft M to turn in one direction only. The worm $m^2$ engages with a worm-wheel N, fast on the shaft C, and carrying a pin $n^1$ which lies in the path of a recess $e^1$ in the crank-arm E. This structure provides a clutch arrangement for coupling the worm-wheel N and the crank-arm E, when the crank-arm E is moved in the direction of the opening movement of the doors.

In the loaded position the parts occupy the positions shown in Figs. 1 and 2. The crank-drive $C^1$ $C^2$ D B is in one of its dead center positions, the worm $m^2$ engages the worm-wheel N and is prevented from turning in the direction of opening the flaps B, by the latch mechanism $h^2$ $m^3$.

In changing to the unloading position, the pawl K is first disengaged from the lever H and the latter is raised in the direction of the arrow $x$, Fig. 1. This causes the worm $m^2$ to be disengaged from the wheel N. When the lever H has reached the position shown in Fig. 2, the pin $n^1$ of the worm wheel N comes into engagement with the recess $e^1$ of the crank-arm E, and the pawl K is moved under the lever H, Fig. 5, by its spring. In the further turning of the lever H, the engagement of the pin $n^1$ in the recess $e^1$ moves the worm-wheel N, which in turn moves the crank-drive $C^1$ $C^2$ D B. When the lever H has reached its highest position, Fig. 6, said drive takes a position in which the flaps B have moved slightly from their closed position. They now open by their own weight and that of the load, and their movement is transmitted to the crank-drive $C^1$ $C^2$ D B and the worm-wheel N, which actuates the crank-arm E, the connections $e^1$ $n^1$ being now broken, and the flaps move to their full unloading position, Fig. 7, independently of the lever H. As soon as they have reached this position, the lever H is first moved back to the position of Fig. 2, in which the worm $m^2$ is still disengaged from the worm-wheel N, whereupon the pawl K is removed out of the path of the lever H and the latter is moved back into its original position. The worm $m^2$ then again engages the wheel N. By turning the hand-wheel $m^1$, finally, the parts are returned to the position of Fig. 1.

Since the flaps tend to open under their own weight and that of the load, only a very small force is required to start the unloading movement, while to return them to the loaded position, the powerful worm gearing $m^2$ N is available, so that the operator does not have to exert much power.

Claims.

1. In a dumping wagon provided with an under-frame, a body, discharge doors, a crank-drive connected to said doors, an operating mechanism connected to said crank-drive for initiating the opening movement of said drive, a second operating mechanism for returning said crank-drive to its closed position, said operating mechanisms, being so interconnected that said second mechanism is automatically disconnected when said first mechanism functions and is thereafter returned into operative position.

2. In a dumping wagon the combination with an under-frame, a body, discharge doors and a crank-drive for operating said discharge doors, of two separate operating mechanisms for said crank-drive, one of said operating mechanisms being connected to move said crank-drive to initiate the opening movement of said discharge doors, said second operating mechanism being connected to said crank-drive so as to return the same to a position corresponding to the closed position of the doors, said operating mechanisms being so arranged that said second mechanism is automatically disconnected when said first mentioned mechanism functions and is thereafter restored into operative position.

3. In a dumping wagon the combination with a body, an under-frame, discharge doors and a crank-drive therefore, of means for moving said crank-drive in a direction to open said doors, said means embodying a clutch, said clutch being so arranged that it functions only in the direction of the opening movement of said door.

4. In a dumping wagon of the class described, an under-frame, a body, discharge doors therefore, a crank-drive for controlling said doors, an operating mechanism for moving said crank-drive to initiate the opening of said doors, said mechanism comprising a shaft operatively connected to said crank-drive, a worm-wheel fixed to said shaft, a crank-arm loosely mounted on said shaft, a crank-lever pivoted to said under-frame and connected to said crank-arm, and a clutch connection between said worm-wheel and crank-arm whereby said crank-drive will be moved in the direction of the opening movement of said discharge doors when said crank-lever is moved in one direction.

5. In a dumping wagon an under-frame, a body, discharge doors for said body, a crank-drive for controlling said doors, an operating mechanism for moving said crank-drive to initiate the opening of said doors, said mechanism embodying a hand-lever pivotally mounted to said under-frame, means for moving said crank-drive to closed position, embodying a worm rotatably mounted on said hand-lever, a shaft operatively connected to said crank-drive, a worm-wheel fixed to said shaft and meshing with said worm, said hand-lever being adapted to be rotated about its pivot when moving said crank-drive to initiate the opening of said discharge doors, said movement disengaging said worm to disconnect said closing mechanism.

6. In a dumping wagon, the combination with an under-frame, a body, discharge doors for said body and a crank-drive for controlling said discharge doors, of operating mechanisms for causing said crank-drive to assume positions corresponding to the open and closed positions of said discharge doors, said mechanisms comprising a hand-lever pivotally mounted to said under-frame, a shaft journalled in said under-frame and connected to said crank-drive, a worm-wheel fixed to said shaft, a crank-arm loosely mounted on said shaft, a link connection between said crank-arm and said hand-lever, a clutch connection between said worm-wheel and said crank-arm whereby when said hand-lever is moved from one end position to the other, said clutch will function to move said crank-drive to initiate the opening of said discharge doors and a worm rotatably mounted on said hand-lever and adapted to engage said worm-wheel when said hand-lever is in its initial position whereby said crank-drive may be restored to its position corresponding to the closed position of said discharge doors.

7. In a dumping wagon the combination with an under-frame, a body, discharge doors for said body and a crank-drive for controlling said discharge doors, of mechanisms for moving said crank-drive to open and close said doors, said opening mechanism comprising a hand-lever pivotally mounted on said under-frame, a shaft journaled in said under-frame and connected to said crank-drive, a worm-wheel fixed to said shaft, a crank-arm loosely mounted on said shaft, a link connection between said crank-arm and said hand-lever, a clutch connection between said worm-wheel and crank-arm comprising a pin carried by said worm-wheel, said crank-arm being provided with a recess for engaging said pin, whereby when said hand-lever is moved from its initial position said crank-arm rotates said worm-wheel and shaft through said clutch connection thereby moving said crank-drive to initiate the opening of said discharge doors, a worm and shaft therefor rotatably mounted on said hand-lever, a latch device preventing rotation of said worm in one direction, said worm being adapted to mesh with said worm-wheel when said hand-lever is in its initial position, whereby said crank-drive may be moved to its closed position.

The foregoing specification signed at Essen, Germany, this 9th day of February, 1922.

PAUL KRÜGER.